July 27, 1926.
C. S. OLSON
1,594,323
SAFETY AIR VALVE
Filed August 22, 1924
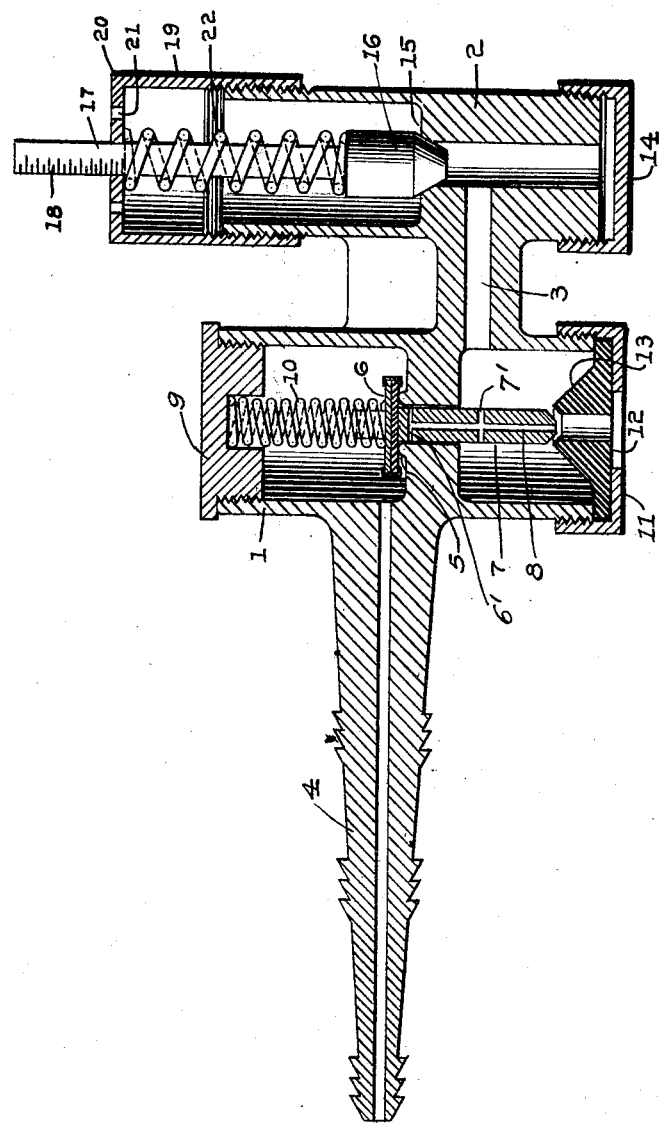
Carl S. Olson
INVENTOR
BY *Victor J. Evans*
ATTORNEY

Patented July 27, 1926.

1,594,323

UNITED STATES PATENT OFFICE.

CARL S. OLSON, OF TROY, IDAHO.

SAFETY AIR VALVE.

Application filed August 22, 1924. Serial No. 733,640.

My present invention has reference to a safety air valve which is used in connection with the air conductor hose for inflating pneumatic tires, and has for its primary object to produce a device of this character which can be set at a desired pounds pressure, and after the desired amount of air has entered the casing, surplus air will be permitted to escape to the atmosphere.

A further object is to produce a device of this character including two casings having a ported connection therebetween, one of the casings having an air inlet passage to which the air conducting hose is connected, and arranged in a line with the said passage there is a valve which is spring seated and which has a hollow stem, apertured at its connection with the valve, said casing having an open end in which is seated a compressible ring designed, when forced over the tire valve to unseat the valve in the said casing to permit of the air flowing into the tire, while the other casing has adjustably arranged therein a spring seated valve, and adjustable means for seating the valve also regulating the amount of air pressure which will unseat the valve, and the unseating of the last mentioned valve permitting air to escape to the atmosphere and whereby only a desired and determined amount of air will be admitted into the tire tube.

The foregoing, and other objects which will appear as the nature of the invention is better understood, may be accomplished by a construction, combination and operative association of parts such as is disclosed by the drawings which accompany and which form part of this application.

In the drawings:—

The figure illustrates an approximately central vertical longitudinal sectional view through the improvement.

Referring now to the drawings in detail, the numerals 1 and 2 designate two cylinders arranged side by side and connected together in any suitable or desired manner. Between the cylinders there is an air port 3. Each of the cylinders preferably has its ends open, and the cylinder 1 is integrally formed with a conical pipe extension 4 through the bore of which air is admitted into the said cylinder. The pipe extension is designed to be connected with the usual air conducting hose.

In this cylinder, below the bore of the air inlet pipe 4 there is a valve seat 5. Resting on the seat and normally closing the passage thereto is a valve 6. The valve is provided with a stem 7 that is guided through the valve seat.

Screwed in one end of the cylinder 1 is a cap nut 9 that has its inner wall centrally formed with a depression forming a seat for a spring 10, the said spring contacting with the valve 6, normally holding the same seated. Screwed in the opposite end of the cylinder 1 there is a flanged cap 11. Held in contact with the lower wall of the cylinder by the flanged cap 11 is a compressible ring 12. The ring has its inner face formed with a rib 13 that surrounds the opening therein, and the said rib is arranged opposite the lower end of the hollow stem 7.

The lower open end of the cylinder 2 is closed by a cap nut 14. The cylinder, at a suitable distance below the port 3 is provided with a valve seat 15, and on this seat there rests the conical end of a valve 16. The valve has a stem 17 which is graduated, as at 18. Screwed on the upper end of the cylinder 3 there is a sleeve 19. The sleeve has a closed top 20 provided with a central aperture through which the valve stem 17 passes, and in addition thereto is provided with any desired number of apertures 21. Contacting with the flanged top of the sleeve 19 and with the top of the valve 16, and surrounding the valve stem 17, there is a helical spring 22.

In operation, the sleeve 19 is screwed until the desired scale mark 18 which indicates the amount of pounds pressure of air to be let into a tire, is in a line with the top of the said tube. The cylinder is then brought over the valve of the tire tube, and the said valve contacting with the compressible ring 12 will force the rib 13 thereof against the lower end of the valve stem 7, unseating the valve 6, against the pressure of its spring 10. The air is then admitted through the inlet port provided in the pipe extension 4, and when the tire is inflated to a desired degree, surplus air will pass through the port 3 from the cylinder 1 into the cylinder 2 to force the valve 16 away from its seat against the pressure of its spring 22, permitting such air to find an outlet through the apertures 21 in the top 20 of the sleeve 19, it being understood that the valve stem 7 is loosely received through the valve seat 5.

The stem 7 of the valve 6 has transverse ports 6' and 7' which communicate with the central port 8. The port 6' is located a slight distance from the valve, and the port 7 is positioned so that the same will at all times be arranged in the chamber in which the arched compressible ring 12 is seated.

Having described the invention, I claim:—

In a device for the purpose set forth, an open casing having an intermediate partition therein dividing the same into an upper and lower compartment, and said casing having pipe extensions whose bores communicate with the respective compartments, said partition being centrally formed with an opening, a valve seat on the partition surrounding the opening and extending into the upper compartment, a flat valve having a compressible facing for the valve seat, a stem for the valve extending in opposite directions therefrom, one of said extensions passing through the mentioned opening in the partition and being provided with a central longitudinal opening and with spaced transverse ports which communicate with the opening, one of said ports being disposed on the stem close to the valve seat, a spring surrounding the upwardly projecting end of the stem, a cap member screwed in the upper compartment and having a central opening to receive the spring therein, a flanged ring for closing the lower compartment, and a centrally ported compressible element engaged by the ring and forced thereby into contact with the lower wall of the casing, and the opening in the said element being disposed to receive therein the lower end of the valve stem.

In testimony whereof I affix my signature.

CARL S. OLSON.